May 7, 1963  H. J. CONLAN  3,088,782
TRACK ROLLER ASSEMBLY
Filed May 1, 1961  2 Sheets-Sheet 1

INVENTOR.
Harry J. Conlan
BY
ATTORNEY

May 7, 1963 H. J. CONLAN 3,088,782
TRACK ROLLER ASSEMBLY
Filed May 1, 1961 2 Sheets-Sheet 2

INVENTOR.
Harry J. Conlan
BY
ATTORNEY

United States Patent Office 3,088,782
Patented May 7, 1963

3,088,782
TRACK ROLLER ASSEMBLY
Harry J. Conlan, Pittsburgh, Pa., assignor to General Motors Corporation, Detroit, Mich., a corporation of Delaware
Filed May 1, 1961, Ser. No. 106,602
4 Claims. (Cl. 308—18)

This invention pertains to load-bearing support assemblies for rotatably mounted members and, in particular, to a track roller assembly for tracked vehicles.

Tracked vehicles, such as crawler tractors, conventionally comprise a main tractor chassis and longitudinally extending track frames suitably connected to opposite sides thereof and supporting the endless tracks of the vehicle. A plurality of longitudinally spaced track roller assemblies are rotatably mounted on each track frame for rolling contact with the ground-engaging portion of the endless tracks of the vehicle. As will be readily apparent to those acquainted with this art, the track roller assemblies of such vehicles are subjected repeatedly to extreme loads both axially and radially thereof and, consequently, particular attention must be given to the bearing assemblies which rotatably mount such rollers. For example, when installing such track roller assemblies on the track frames of the vehicle, particular care must be taken in properly preloading the bearing assemblies thereof to insure optimum transfer of loads from the roller to the track frame and otherwise obtain a sustained period of trouble free operation from the roller assembly.

In installing such roller assemblies on a track frame, whether at the factory or in the field, it has been conventional practice to utilize one or more shim members in mounting the respective end caps or roller support housings to the track frame, the shims being utilized to properly position the support housings axially relative to each other to provide the desired predetermined preload. As will be apparent, such an installation procedure often involves gauging and regauging the preload and addition and removal of shims at one or the other housing to obtain the desired preload. Needless to say, such a procedure is not very desirable in view of mass production techniques. However, more importantly, such a procedure has been found to result in a relatively great variation in the preload of the bearings on successive tractors coming from the same assembly line. Furthermore, the same problem is presented in the field and is accentuated when it is considered that such roller assemblies are often replaced by maintenance personnel who either lack the requisite experience or necessary equipment possessed by manufacturing personnel, or both, resulting in assembled track rollers having too loose or too tight a preload in their bearings.

It is, therefore, a principal object and feature of this invention to provide an improved bearing support for a rotatably mounted member which may be accurately preloaded prior to installation on the supporting member for which it is intended, thereby insuring proper preload of the bearing without further attention being given thereto upon installation on such supporting member.

It is yet another object and feature of this invention, with specific reference to a track roller assembly for a tracked vehicle, to provide such an assembly comprising a rotatably mounted roller, an end cap or support housing at each end of the roller adapted to be rigidly secured to the track frame of the vehicle, load bearing assemblies disposed between each end of the roller and its associated end cap or support housing, and means for adjusting the end caps axially relative to each other to adjust the preload on the bearing assemblies prior to installation of the roller assembly on the tracked vehicle.

In general, these and other objects of the invention are attained, with particular reference to a live shaft track roller assembly for a tracked vehicle, in an assembly comprising a roller including axially aligned axle shafts rigidly secured to and projecting axially from opposite sides of the roller so as to be received respectively within end caps or support housings. A bearing assembly surroundingly engages each axle shaft and is interposed between the latter and its associated end cap or support housing. Furthermore, each of these bearing assemblies comprises inner and outer races having a plurality of anti-friction load-bearing roller elements disposed therebetween, each inner race of each bearing assembly being secured to one axle shaft and the outer bearing race being secured to its associated end cap. A bolt extends between and interconnects the aforementioned end caps on an axis coincident with the axis of rotation of the roller, and includes a threadably adjustable nut at one end thereof to accomplish axial adjustment of the end caps relative to each other. As a consequence of this construction, the end caps may be adjusted axially relative to each other thereby preloading the bearing assemblies. Therefore, track roller assemblies, including roller assemblies sold for the replacement market, may be bench preloaded at the factory, and irrespective of installation at the factory or in the field, such roller assemblies may be mounted on the track frame of the vehicle merely by bolting or otherwise rigidly securing the end caps to the track frames without further attention being given to the loading of the bearings.

The objects of the invention and the manner in which they are attained will become more apparent hereinafter as the description of the invention proceeds, and in which reference is made to the drawings in which.

At this juncture, and as will become more fully apparent hereinafter, the present invention may be usefully employed in many environments. However, for the purpose of illustrating and describing a preferred embodiment of the invention, the drawings show and the following description is directed to a particular preferred use thereof in conjunction with a crawler type vehicle.

Figure 1:
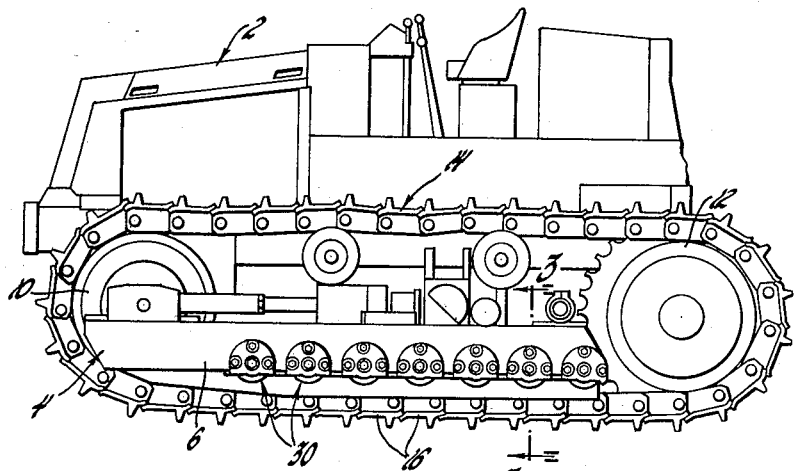
FIGURE 1 is a side elevational view of a crawler tractor equipped with a preferred embodiment of the invention.
Figure 2:
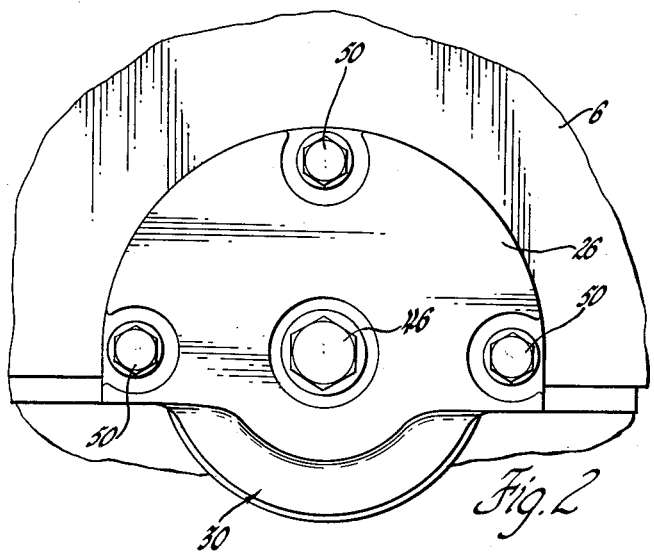
FIGURE 2 is an enlarged framentary view of a portion of FIGURE 1.
Figure 3:
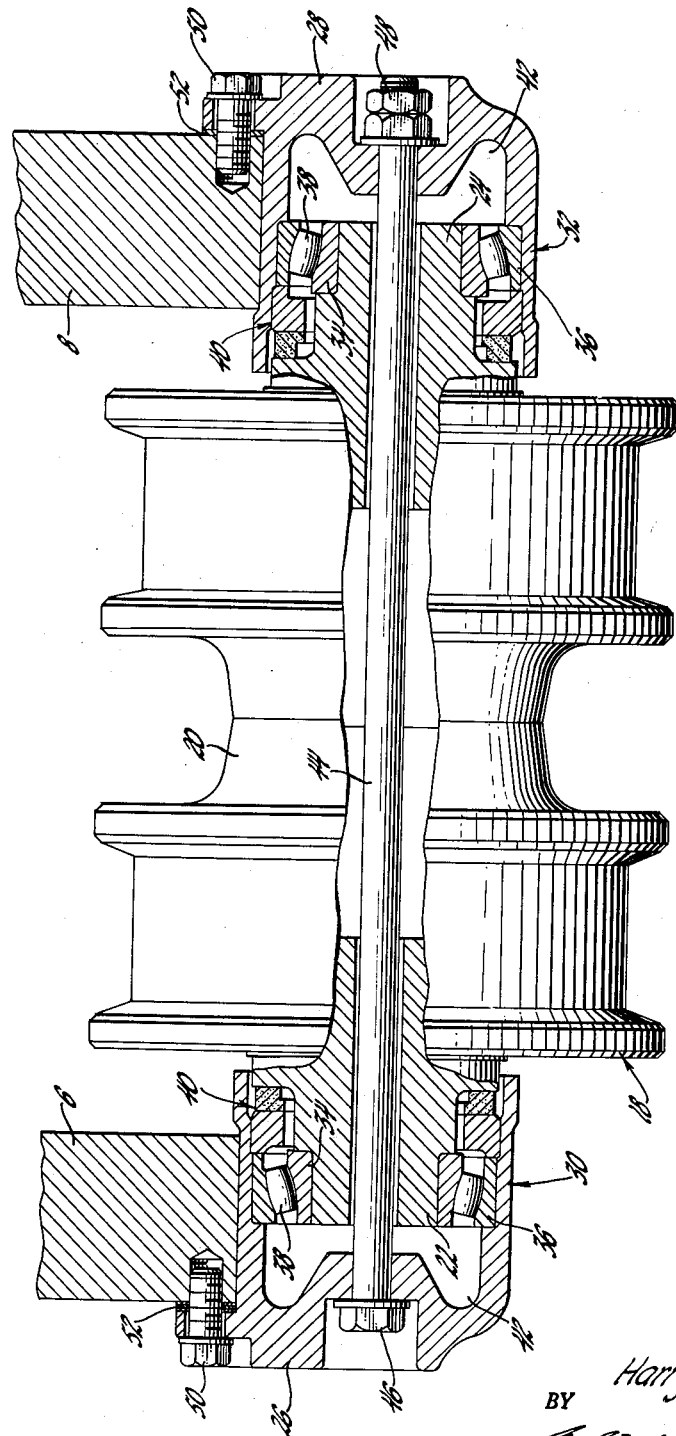
FIGURE 3 is an enlarged view taken on line 3—3 of FIGURE 1.

Referring now to FIGURE 1 of the drawings, the crawler tractor 2 comprises a longitudinally extending track frome 4 on each side thereof, only that frame on the left side of the vehicle being shown, each track frame including rigidly interconnected laterally spaced frame members or rails 6 and 8 (FIGURE 3). An idler wheel 10 is mounted at the forward end of each track frame, while a driving sprocket wheel 12 is mounted on the tractor and extends into substantial alignment with each of the respective track frames. A ground-engaging endless track 14 is entrained about the idler and sprocket wheels of each track frame, and the sprocket wheels are driven to propel the vehicle in a manner well known in this art. Inasmuch as the details of such a tractor vehicle in and of itself form no part of the present invention and are well known in the art, further description of such details is deemed to be unnecessary. The ground-engaging portion 16 of each endless track intermediate the idler and sprocket wheels is engaged and supported by a plurality of live shaft track roller assemblies indicated generally at 18 and spaced longitudinally of each track frame 4.

Each roller assembly comprises a main roller body 20 having its periphery suitably flanged as indicated in FIGURE 3 so as to engage and guide the track links of the endless track in a manner well known in the art. Axially aligned stub axle shafts 22 and 24 are formed integral with or otherwise rigidly secured to opposite end faces of the roller body 20 and project axially therefrom. Each of these axle shafts projects into a respective hollow cylindrical end cap, housing or bearing support 26 and 28, and anti-friction bearing assemblies 30 and 32 are respectively disposed between each axle shaft and its associated end cap in order to rotatably support the roller body about the axis of the axle shafts. Each of the bearing assemblies 30 and 32 comprises an annular inner race 34 and an oppositely disposed annular outer race 36 between which there are disposed a plurality of circumferentially spaced anti-friction roller bearing elements which, in this case, are barrel type roller bearing elements 38. The dispositions of the bearing races and the roller bearing elements are such as to enable the bearing assemblies to absorb and transfer loads imposed on the roller both radially and axially thereof as will be apparent to those skilled in this art.

The inner race 34 of each bearing assembly is suitably rigidly secured as by press-fitting about the extreme outer end of a respective axle shaft, while the outer race 36 of each assembly is similarly secured within its associated end cap or housing. Suitable seal means indicated generally at 40 is interposed between the open end of each end cap and its associated axle shaft, a cavity 42 being provided between the end of each axle shaft and its associated end cap adapted to be charged with a lubricant for the bearing assembly. A rigid bolt 44 extends axially through the roller 20 coincident with the axis of rotation of the latter and includes a head 46 at one end thereof engaged with the exterior surface of the end cap 26, and is threaded at the other end thereof to receive an axially adjustable lock nut means 48 engaging the exterior of the other end cap 28.

It will now be apparent that, in initially assembling the track roller 20, bearing assemblies 30 and 32 and the respective end caps 26 and 28, the bolt 44 is passed between the end caps and the nut means 48 is adjusted to draw the end caps axially toward each other to preload the bearing assemblies, suitable gauges and other devices being employed for this purpose. Thereafter, such assembled track rollers may then be installed on a tractor at the factory or in the field without need for further attention to such preload. Thus, the respective end caps or support structures 26 and 28 may be suitably rigidly secured as by fasteners 50 to the respective frame members 6 and 8 of each track frame 4 so as to dispose the rollers transversely between such frame members in engagement with the ground-engaging portion 16 of each track. While the end caps may be so secured in any suitable manner, preferably they are secured in downwardly opening semi-circular recesses in the track frames in the manner and for the purpose more fully described in United States Patent No. 2,823,079, entitled "Track Roller Assembly," granted to R. C. Williams on February 11, 1958. When installing such a roller assembly between the frame members 6 and 8, shims 52 may be utilized as required to properly position or locate the roller assembly relative to the ground-engaging portion of the track, it being understood that these shims are not required for preloading the bearing assemblies as has been necessary in the prior art.

While but one form of the invention has been shown and described, other forms will now be apparent to those skilled in the art. Therefore, the embodiment shown in the drawing is merely for illustrative purposes, and is not intended to limit the scope of the invention which is defined by the claims which follow.

I claim:
1. A track roller assembly adapted to be mounted on a track frame of a tracked vehicle comprising a roller, axially aligned roller support members at respective ends of said roller, bearing means disposed between the ends of said roller and their respective support members, axially adjustable means including a bolt extending through the roller and said support members to connect and position the latter axially relative to each other to preload said bearing means, and means for mounting said support members on the track frame to support said roller on the latter and permit axial adjustment of the preloaded roller assembly relative to the track frame.

2. A track roller assembly adapted to be mounted on a track frame of a tracked vehicle comprising a rotatable track roller, axially aligned roller support members at respective ends of said roller, bearing means disposed between the ends of said roller and their respective support members, axially adjustable means extending between and connecting said support members to position the latter axially relative to each other to preload said bearing means, and means for mounting said support members on a track frame to support said roller on the latter and permit axial adjustment of the pre-loaded roller assembly relative to the track frame.

3. A track roller assembly adapted to be mounted on a track frame of a tracked vehicle comprising a track roller, axially aligned axle shafts rigidly secured to and projecting from opposite sides of said roller, a bearing support for each of said shafts, a bearing assembly disposed between each of said shafts and its associated bearing support to rotatably support each of said shafts, axially adjustable means connecting said bearing supports to position the latter axially relative to each other to preload said bearing assemblies, and means for mounting said bearing supports on a track frame to support said roller on the latter and permit axial adjustment of the pre-loaded roller assembly relative to the track frame.

4. A track roller assembly adapted to be mounted on a track frame of a tracked vehicle comprising a track roller, axially aligned axle shafts rigidly secured to and projecting from opposite sides of said roller, a bearing assembly rotatably supporting each of said shafts, each of said assemblies including oppositely disposed inner and outer annular races having a plurality of anti-friction load-bearing elements disposed therebetween, said inner race of each bearing assembly being secured about a respective shaft, an end cap receiving and supporting each shaft and its associated bearing assembly and adapted to be rigidly secured to a track frame to support said roller on the latter, said outer race of each bearing assembly being secured within a respective end cap, axially adjustable means including a bolt extending axially through the roller and said end caps to connect and position the latter axially relative to each other to preload said bearing assemblies, and means for mounting the end caps on the track frame to support the roller on the latter and permit axial adjustment of the preloaded roller assembly relative to the track frame.

References Cited in the file of this patent
UNITED STATES PATENTS

| | | |
|---|---|---|
| 2,158,161 | Trout | May 16, 1939 |
| 2,690,933 | Bechman | Oct. 5, 1954 |
| 2,880,041 | Brownyer | Mar. 31, 1959 |